US010526147B2

(12) United States Patent
Menke et al.

(10) Patent No.: US 10,526,147 B2
(45) Date of Patent: Jan. 7, 2020

(54) CONVEYING OF PLASTIC BOTTLES

(71) Applicant: REXNORD FLATTOP EUROPE B.V., 's-Gravenzande (NL)

(72) Inventors: Cornelis Hendrik Mijndert Menke, 's-Gravenzande (NL); Leonardus Adrianus Catharinus Cornelissen, 's-Gravenzande (NL)

(73) Assignee: REXNORD FLATTOP EUROPE B.V., 's-Gravenzande (NL)

( * ) Notice: Subject to any disclaimer, the term of this patent is extended or adjusted under 35 U.S.C. 154(b) by 0 days.

(21) Appl. No.: 15/531,882

(22) PCT Filed: Dec. 4, 2015

(86) PCT No.: PCT/NL2015/050847
§ 371 (c)(1),
(2) Date: May 31, 2017

(87) PCT Pub. No.: WO2016/089213
PCT Pub. Date: Jun. 9, 2016

(65) Prior Publication Data
US 2017/0260003 A1    Sep. 14, 2017

(30) Foreign Application Priority Data
Dec. 4, 2014 (NL) ..................................... 2013917

(51) Int. Cl.
*B65G 17/08* (2006.01)
*B65G 15/62* (2006.01)
(Continued)

(52) U.S. Cl.
CPC .............. *B65G 17/08* (2013.01); *B29C 49/48* (2013.01); *B65D 1/0207* (2013.01);
(Continued)

(58) Field of Classification Search
CPC ...... B65G 17/00; B65G 15/62; B65D 1/0207; B65D 1/0284
(Continued)

(56) References Cited

U.S. PATENT DOCUMENTS 3,352,404 A   11/1967   Di Settembrini
5,368,151 A *  11/1994  Klenk ..................... B08B 9/205
                                                            198/426
(Continued)

FOREIGN PATENT DOCUMENTS

CN          2711047 Y     7/2005
CN          203461222 U   3/2014
(Continued)

OTHER PUBLICATIONS

International Search Report and Written Opinion dated Apr. 21, 2016 in connection with PCT/NL2015/050847.

*Primary Examiner* — Douglas A Hess
(74) *Attorney, Agent, or Firm* — Quarles & Brady LLP

(57) ABSTRACT

A conveying system (1), comprising a modular conveyor belt (2) supported on a conveyor track (3) so that top surfaces (4) of the modules (5) of the conveyor belt present a conveying face (6) that in use moves along the track in a conveying direction, and at least one plastic bottle supported at its bottom on the conveying face via one or more textured surfaces at a bottom of the bottle. The disclosure also includes a method of conveying bottles, wherein plastic bottles are supported with their bottoms on a moving conveying face of a conveyor, and wherein the conveying face and the bottom of the bottle are conveyed via one or more textured surfaces (12) at a bottom of the bottle. The disclosure further includes use of at least one textured bottom surface of a plastic bottle for conveying, and a blow mold for blow molding a plastic bottle.

3 Claims, 3 Drawing Sheets

Figure 1:
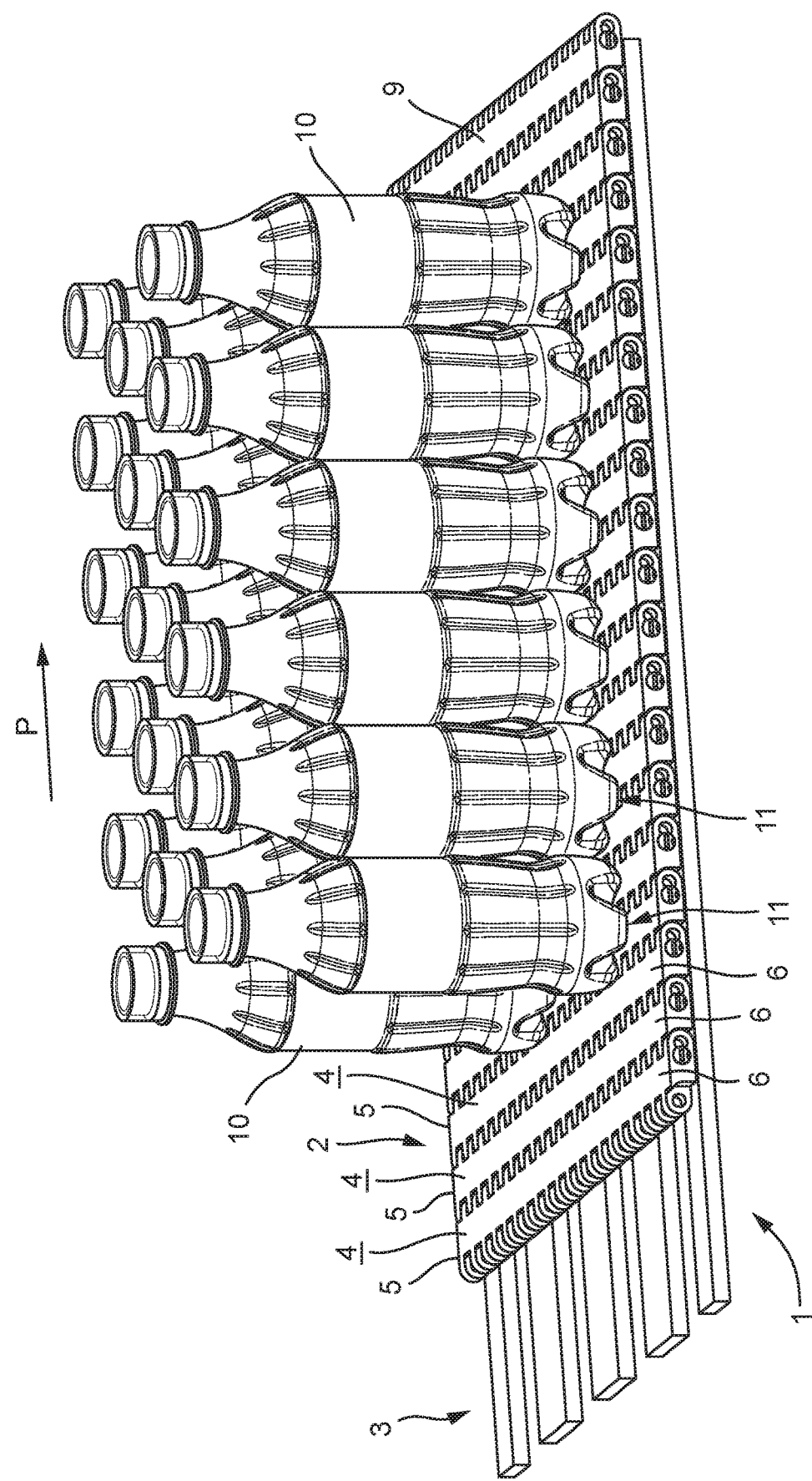

(51) Int. Cl.
*B65D 1/02* (2006.01)
*B65D 1/40* (2006.01)
*B29C 49/48* (2006.01)
*B29L 31/00* (2006.01)

(52) U.S. Cl.
CPC ........... *B65D 1/0284* (2013.01); *B65G 15/62* (2013.01); *B29C 2049/4879* (2013.01); *B29L 2031/7158* (2013.01); *B65G 2201/0244* (2013.01)

(58) Field of Classification Search
USPC ... 198/470.1, 803.8, 836.1, 844.1, 957, 617, 198/866
See application file for complete search history.

(56) References Cited

U.S. PATENT DOCUMENTS

| | | | |
|---|---|---|---|
| 5,829,614 A | | 11/1998 | Collette et al. |
| 5,938,005 A | * | 8/1999 | Stokman ................ B65G 15/62 198/825 |
| 7,574,846 B2 | * | 8/2009 | Sheets ................... B65D 1/0261 198/803.8 |
| 7,926,243 B2 | * | 4/2011 | Kelley .................... B65B 61/24 215/381 |
| 8,574,477 B2 | * | 11/2013 | Derrien ................... B29C 35/16 198/803.3 |
| 8,919,536 B2 | * | 12/2014 | Paroth .................... B65G 15/50 198/604 |
| 9,073,698 B2 | * | 7/2015 | Huettner ............. B65G 21/2072 |
| 9,090,408 B2 | * | 7/2015 | Hahn ................... B65G 47/847 |
| 9,718,619 B2 | * | 8/2017 | Huettner ................ B65G 17/08 |
| 9,834,382 B2 | * | 12/2017 | Van Den Berg ....... B65G 17/40 |
| 2007/0267384 A1 | | 11/2007 | Field |
| 2013/0153529 A1 | | 6/2013 | Nakayama et al. |
| 2013/0228418 A1 | | 9/2013 | Paroth et al. |
| 2013/0270214 A1 | | 10/2013 | Huels et al. |
| 2017/0174384 A1 | | 6/2017 | Evans et al. |

FOREIGN PATENT DOCUMENTS

| | | |
|---|---|---|
| DE | 102011114250 A1 | 3/2013 |
| EP | 2 954 500 A1 | 5/2013 |
| EP | 2594500 A1 | 5/2013 |
| WO | 96/41759 A1 | 12/1996 |
| WO | 0104220 A1 | 1/2001 |

\* cited by examiner

CONVEYING OF PLASTIC BOTTLES

CROSS-REFERENCE TO RELATED APPLICATIONS

This application represents the national stage entry of PCT International Application No. PCT/NL2015/050847 filed on Dec. 4, 2015, which claims the benefit of Netherlands Patent Application No. 2013917 filed on Dec. 4, 2014, the entire contents of which are incorporated herein by reference for all purposes.

The invention relates to conveying plastic bottles.

Plastic bottles are widely used to package products, and are in some industries even amongst the most common packaging forms. For example, in the beverage industry, one of the most common packaging forms for home consumption of soft drinks is bottling in PET bottles. PET bottles are strong, light weight and offer good recyclability. The bottles are often blow molded from preforms, and typically include a number of downwardly projecting feet at their bottoms. Plastic bottles are often thin walled, e.g. with a wall thickness between 0.1 and 2 mm, and have volumes ranging e.g. from 0.1 to 5 liters.

When handling plastic bottles, e.g. for bottling or labelling, bottles are often moved along by conveying, both in empty or filled condition. Typically, the bottles are then supported with their bottoms on a moving conveying face of the conveyor. The bottles may be conveyed in bulk along wide conveyor tracks, at relatively low speed with several bottles next to each other, e.g. to or from a buffer zone. The bottles may at times also be conveyed single file at relatively high speed, e.g. to or from a labelling or filling station. The bottles are typically guided along the conveying face using guide rails, e.g. to follow a curved path or to transfer between conveyors. Bottles on the conveying face thus at times need to accelerate, decelerate or change direction relative to the conveying face.

Bottles typically have a height that is greater than the maximum cross sectional dimension, e.g. a height that is at least 2 or 3 times the diameter. Due to the bottles being relatively tall compared to their diameter, care should be taken that the movement relative to the conveying face does not cause the bottle to topple over. This is in particular the case when the bottles are conveyed using a modular conveyor of which the conveying face is potentially less smooth as it is not integrally formed, but made up of the top surfaces of individual conveyor modules. Especially when the bottles are without support of neighboring bottles, it can be very difficult to keep the bottles from toppling over. Toppling over of a single bottle on a conveyor may result in large numbers of bottles toppling over, and to the bottles becoming damaged.

For dependable conveying of bottles, it is therefore desirable to have a relatively low, and reliably constant friction between the bottom of the bottle and the conveying face. In practice, external lubricants are provided to the conveying face, e.g. Teflon or silicone based dry, semi-dry or liquid lubricant. Also, soap or oil based liquid lubricants are used lubricant.

From a handling point of view, it is however much preferred if the bottles could be conveyed without such external lubrication. This, however, poses problems of too much friction. Especially when the conveying face includes a plastics material, adhesive contact may occur due to polarity of both the bottle and the conveyor material.

To reduce friction, it has been proposed to provide the top surfaces of conveyor modules with projections, for example as described in WO 96/41759 and DE 102011114250. Such projections or other structures reduce the actual contact area between the bottles and the conveying face, which reduces adhesive contact and friction. In practice, however, such a textured conveying face becomes dirty and is prone to wear, and can therefore not offer the reliably constant low friction that is offered by a lubricated conveying face.

The invention aims to alleviate the above disadvantages. Thereto the invention provides for conveying of plastic bottles with their bottoms supported on a conveying face of a conveyor via one or more textured surfaces provided at a bottom of the bottle. By providing the textured surface(s) at the bottom of the bottle, it can be ensured that the one or more textured surfaces are relatively fresh and clean during conveying. This because in the conveying process, the bottles are only conveyed for a relatively short period of time compared to the standing time of the conveyor belt, so that during conveying in practice deterioration of a textured surface at the bottom of a bottle is minimal. For example, in a typical bottling process a bottle may be conveyed on the conveying face for several minutes or typically less than an hour, whereas the standing time of the conveying face is typically more than a year, or at least more than a month. Not only does the provision of a textured surface profile on the bottom of the bottle provide for predictable and well controlled friction, it also allows the surface of the conveyor to be optimized for other parameters than friction. For example, the top surfaces of modules making up the conveying face may de designed to be flat and smooth to achieve optimum cleanability and/or strength of the surface. The textured surface(s) at the bottom of the bottle may form a contact reducing surface profile superposed on the bottom wall of the bottle to provide a reliably low and constant coefficient of friction during conveying. Typical coefficients of friction between the conveying face and the textured surface(s) provided at the bottom of the bottle range between 0.06 and 0.18, in particular between 0.07 and 0.16, more in particular between 0.08 and 0.12, without external lubrication. The provision of the textured surface(s) is an adaptation that has little impact on manufacturing, appearance or consumer use of the bottle, yet it solves a big problem in conveying the bottle.

Within the context of this patent specification, the term 'textured surface' is to be construed as a surface portion that is rough compared to an adjacent surface portion of the bottle. Such adjacent surface portion may in particular have a surface finish that is smooth compared to the textured surface. Such adjacent surface portion may in the context of this application then in particular be considered a non-textured surface. Such a smooth surface may, as a matter of reference, as smooth as a regular wall of a typical plastic bottle. The textured surface may thus be rough compared to a surface having the normal surface finish of the walls of a conventionally blow molded standard commercial 1.5 liter Coca Cola PET bottle as currently available in supermarkets in The Netherlands. Such adjacent surface may typically be an adjacent surface on the bottom of the bottle. In case of a bottle made of a transparent or translucent material, such textured surface may cause the surface to be opaque, while the adjacent, non-textured surface may be clear.

The at least one bottle may as mentioned above be supported on the conveying face via the textured surface(s) free of external lubrication between the bottle and the conveying face. It should be noted that, if desired, some external lubrication may still be provided, e.g. water or some moisture. Further, it should be noted that internal lubrication may be provided, e.g. lubricants included in the material of the plastic bottle or plastic conveyor modules.

In particular, the invention provides for a conveying system, comprising a modular conveyor belt supported on a conveyor track so that top surfaces of the modules of the conveyor belt present a conveying face that in use moves along the track in a conveying direction, and at least one plastic bottle supported at its bottom on the conveying face via at least one textured surface at a bottom of the bottle. Preferably, the conveying system includes a plurality of plastic bottles supported on the conveying face, each bottle including said textured surface(s).

The bottle, especially the bottom of the bottle, may be provided with one or more base surfaces that face a supporting surface such as a table top or conveying face, when the bottle stands upright. The base surface may form, comprise or be part of the textured surface. Said one or more base surfaces can be located in a lowermost outer boundary of the bottle. In embodiments, said lowermost outer boundary of the bottle can for instance be formed by a substantially flat portion of the bottom wall of the bottle, which in that case can form a relatively large base surface. However, in other embodiments, the bottom wall of the bottle can for instance be provided with downwardly projecting support feet, wherein lowermost end faces of the support feed can form base surfaces on which the bottle can be supported.

The one or more base surfaces may each have a surface area of several cm$^2$ or less, e.g. less than 1 cm$^2$, or less than 0.5 or 0.2 cm$^2$ per base surface.

In preferred embodiments, the one or more base surfaces of the bottle may combined cover a surface area being substantially smaller than the largest horizontal cross-sectional area of the bottle. For example, the (combined) surface area covered by the base surface(s) can be less than 70% of the cross-sectional area of the bottle, preferably less than 50% or 30%, especially less than 20% or 10%, for instance less than 5% or 2%, or even less than 1% or 0.5%.

The base surface(s) may be provided with projections and may form the textured surface(s) at the bottom of the bottle.

The textured surface(s) at the bottom of the bottle may include projections that project from a respective base surface at the bottom of the bottle, and the projections may engage the conveying face to form together a combined contact area that is smaller than a base area of the engaged projections, i.e. an area covered by the one or more base surfaces from which the engaged projections project. The engaged projections may each have an individual contact area of several mm$^2$ or less, e.g. less than 1, 0.5 or 0.1 mm$^2$, or less than 0.05, 0.02 or 0.01 mm$^2$ per projection. The combined contact area of the engaged projections may be less than 50% of the base area of the projections, preferably less than 30% or 20%, for instance less than 10% or 5%, or even less than 2% or 1%. The projections may be spaced apart from each other over less than 1 mm, e.g. less than 0.5 or 0.2 mm, or even less than 0.1 or 0.05 mm, measured center to center. The projections may successfully be formed as microstructures having dimensions and/or spacings in the range of tenths of millimeters. The engaged projections of the textured surface at the bottom of the bottle that cooperate with the conveying face when the bottle stands on the conveyor may have a total contact area that is less than 0.5%, preferably less than 0.2 or 0.1% of the area of projection of the bottle along its upright axis onto the conveying face, i.e. the maximum cross sectional area of the bottle along its height. By providing the textured surface onto support feet of a bottle, the already very minimal actual contact area of non-textured support feet may be reduced significantly further to be e.g. half or $\frac{1}{10}^{th}$ of the actual contact area of the non-textured support feet, without significantly reducing the stability of the bottle.

The textured surface(s) may be provided on the bottom of the bottle, e.g. on the bottom wall of the bottle or on a bottom cap of the bottle. In case the one or more base surfaces are part of a bottom wall of the bottle, no auxiliary structure is needed on the bottom of the bottle. The textured surface(s) may also be provided on an auxiliary structure or part that at least during conveying forms the bottom of the bottle, e.g. on a skid plate or sticker attached to the bottom of the bottle, especially to the feet of the bottle.

The textured surface(s) may include projections or structural elements projecting from a respective base surface, e.g. intersecting or concentric ridges, lands between grooves, nodules, tears, prisms, pyramids, hemispheres, dimples, or may each just be formed as a rough surface to provide a friction reducing surface profile. The textured surface(s) at the bottom of the bottle may be provided directly on the bottom itself, e.g. by removing, displacing or adding material, or may be transferred thereon via a transfer process, e.g. molding. The surface texture or its mirrored image in case of a mold may e.g. be provided e.g. by electronic discharge machining (EDM), abrasion, chemical milling (CM), engraving, embossing, etching, milling, cutting, sandblasting, impacting or other technique to form a contact reducing surface profile. The texture may be patterned or may be random.

The textured surface(s) may be provided at the base surface(s), e.g. at the ends of support feet projecting downward at the bottom of the bottle. This way, the textured surface(s) can be provided only there were it/they is/are needed for reducing friction during conveying, and need not or hardly influence the appearance of the bottle.

If desired, the textured surface(s) may be removed or smoothened after conveying, e.g. in a polishing step.

Preferably, the textured surface(s) can comprise polyethylene terephthalate (PET). PET is a material with which the coefficient of friction on a steel or plastic conveying face may be reduced and maintained at a controlled, desirably level for conveying the a bottle through a regular packaging process that includes e.g. bottling, labelling and batching into transport groups. The textured surface(s) may be made of PET, and advantageously, the bottle may comprise or may be made of PET.

When the top surfaces of the modules conveyor are made of plastic, e.g. a hard, strong and/or wear resistant plastic, e.g. POM, PA, or PBT, the textured surface(s) may be especially useful to bring friction for the bottle to a desirable low level without external lubricant.

The modular conveyor belt may be arranged to recirculate between first and second divert elements, a top run of the conveyor extending between the first and second elements and being supported on a conveyor track, so that in the top run, top surfaces of the modules of the conveyor belt present a conveying face that in use moves in a conveying direction from the first divert elements towards the second divert element. The conveying system may comprise a plurality of plastic bottles, each supported at its bottom on the conveying face via one or more textured surfaces at the bottom of the bottle.

The invention also provides for a method of conveying bottles, with use of a conveying system as discussed above or without, wherein plastic bottles are supported with their bottoms on a moving conveying face of a conveyor, and wherein the conveying face and the bottom of the bottle are conveyed via one or more textured surfaces at a bottom of the bottle. In addition, the invention also provides for the use of at least one textured bottom surface of a plastic bottle for conveying. Further, the invention provides for a blow mold for blow molding a bottle, including at least two mold parts that in a closed position cooperate to form a cavity defining the outer shape of a bottle, and in an open position allow a bottle to be taken out of the cavity, and positioning means for positioning a preform to a bottle, wherein the cavity is provided with a counter form for providing a textured surface at a part of the cavity corresponding to the bottom of the bottle to be formed. The invention also relates to a plastic bottle provided with one or more textured conveying surfaces at the bottom.

It should be noted, that the steps and technical features described herein may each on its own be embodied in a method of conveying or conveying system, i.e. isolated from the context in which it is described, separate from other steps or features, or in combination with only a number of the other steps or features described in the context in which it is disclosed. Each of these steps or features may further be combined with any other step or feature disclosed, in any combination.

Figure 2:
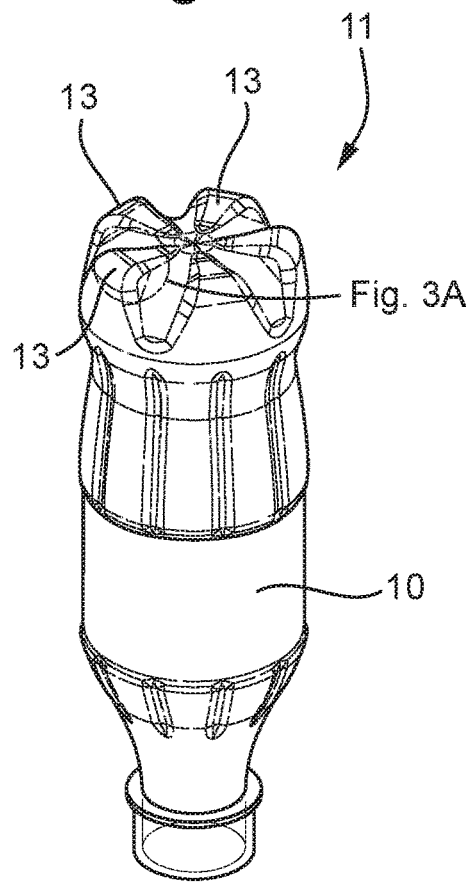

The invention will be further elucidated on the basis of a non-limitative exemplary embodiment which is represented in a drawing. In the drawing:

FIG. 1 shows a schematic perspective view of a conveying system presenting a conveying face comprising a plurality of plastic bottles, each supported at its bottom on the conveying face via one or more textured surfaces at the bottom of the bottle, FIG. 2 shows a schematic perspective bottom view of a plastic bottle of the system of FIG. 1, and FIGS. 3a-3e show a detail of the bottle of FIG. 2 including one of its textured surfaces.

It is noted that the figures are merely schematic representations of a preferred embodiment of the invention. In the figures, identical or corresponding parts are represented with the same reference numerals.

FIG. 1 shows a conveying system 1. The conveying system comprises a modular conveyor belt 2 supported on a conveyor track 3. Top surfaces 4 of the modules 5 of the conveyor belt 2 present a conveying face 6. The conveying face 6 in use moves along the track 3 in a conveying direction, indicated with arrow P. The modular conveyor belt 2 is typically arranged to recirculate between first divert elements and second divert elements. A top run 9 of the conveyor belt 2 then extends between the first and second elements and is supported on the conveyor track 3. The conveying face 6 in use moves in the conveying direction P from the first divert elements towards the second divert elements. The modules 5 of the conveyor belt 2 are in this example made of plastic, and can be injection molded, e.g. from PBT, and the top surfaces of the modules can be provided with a smooth, substantially flat non textured surface.

The conveying system comprises a plurality of plastic bottles 10. Each bottle is supported at its bottom 11 on the conveying face 6 via a number of textured surfaces 12 at the bottom 11 of the bottle 10. Although the bottle 10 in the embodiments shown here comprises five textured surfaces 12, alternative bottles can comprise more or less than five textured surfaces, e.g. one, two, four or six textured surfaces. The bottles 10 are in this example supported on the conveying face 6 via the textured surfaces 12 free of external lubrication between the bottle 10 and the conveying face 3, i.e. without added lubrication. Hence, dirtying the conveyor system 1, e.g. its conveyor belt 2 and/or dirtying the bottles 10 can be counteracted.

The bottles 10 in this example are made of PET, and have been blow molded in a mold from a standard injection molded preform. The bottles in this example are 1.5 l carbonated soft drink bottles having a height of about 30 cm, and a base diameter of about 8 cm. The bottles are thin walled, and have a wall thickness of about 0.8 mm at the bottom, and have a volume of 1.5 l. The bottles 10 include downwardly projecting feet 13 at their bottoms. The blow mold used for blow molding the bottles includes two mold halves. In a closed position the mold halves cooperate to form a cavity defining the outer shape of a bottle, and in an open position they are spaced apart to allow a bottle to be taken out of the cavity. In the closed position of the mold, the preform is positioned within the mold cavity, and positioning means position the preform in the cavity, so that it can be blown against the cavity walls to form a bottle. The cavity is provided with a counterformed, inverted texture at a the bottom of the cavity, so as to provide a corresponding textured surface at the bottom of the feet 13 of the bottle 10 to be formed. The texture may be provided in the mold cavity using electronic discharge machining.

The textured surface 12 is in the example integrally formed with the bottom wall 14 of the bottle 10, and is provided at the extremities of support feet 13 projecting downward at the bottom 11 of the bottle 10.

Figure 3A:
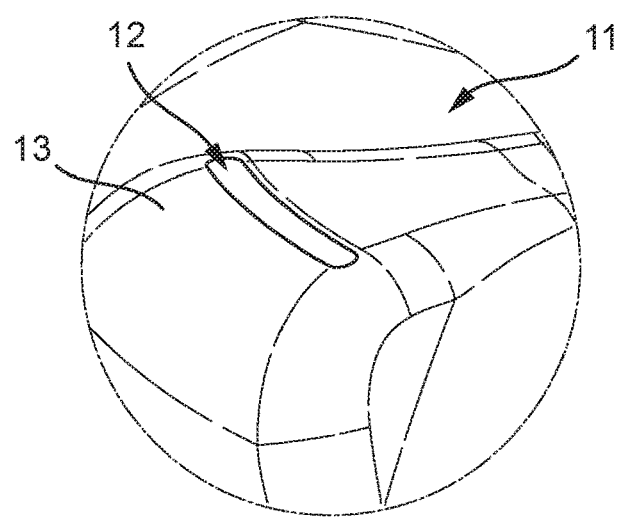
Figure 3B:
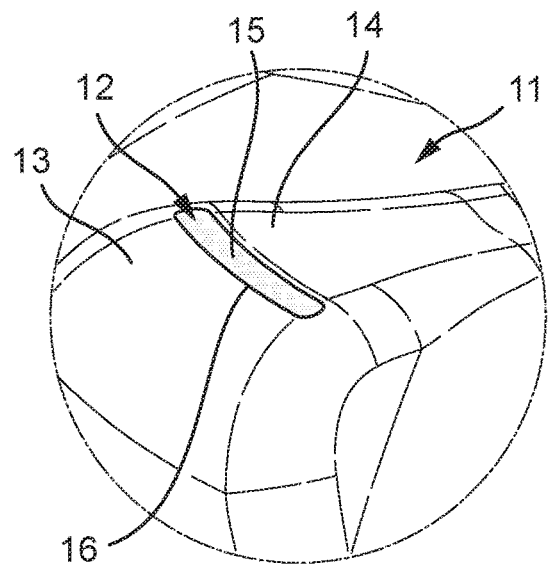
Figure 3C:
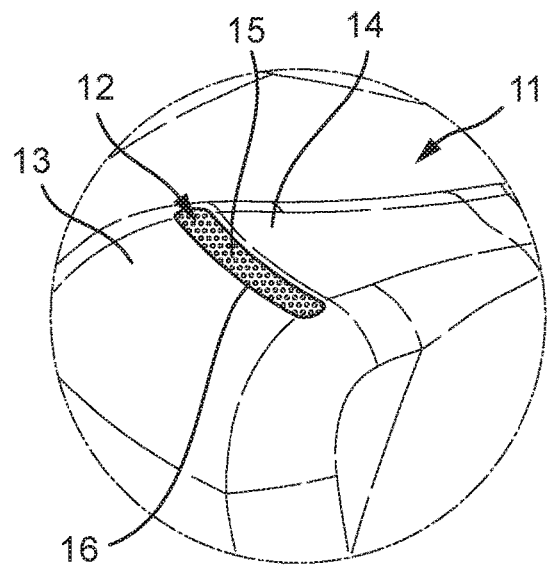
Figure 3D:
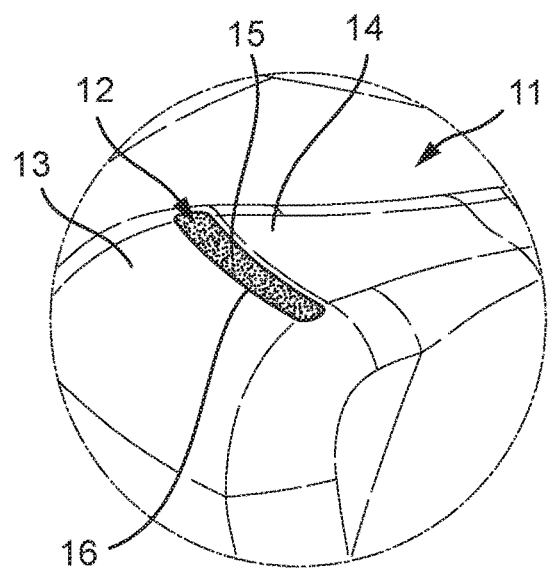
Figure 3E:
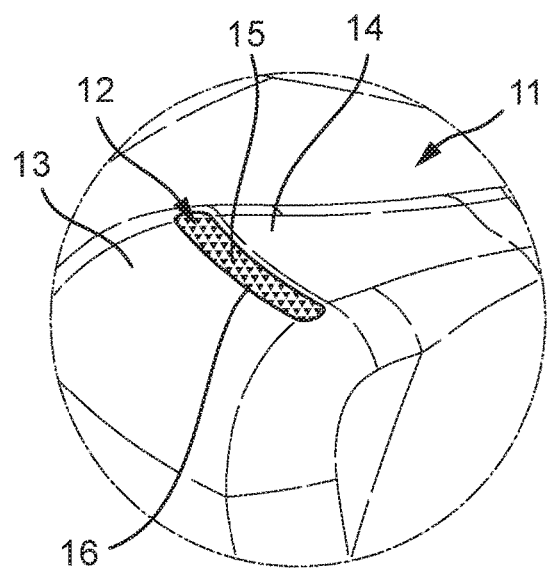

As can be seen in FIGS. 3, in particular FIG. 3e, the textured surface 12 includes projections 15 that project from a base surface 16 at the bottom 11 of the bottle 10. The projections 15 are designed to engage the conveying face to together form a combined contact area that is smaller than a base area of the engaged projections, i.e. an area covered by the base surface 16 from which the projections 15 project. In use, fresh plastic bottles 10 are placed on the top run 9 of the conveyor belt 2, and are conveyed in the conveying direction P. The plastic bottles 10 are supported with their bottoms 11 on the moving conveying face 6 of the conveyor 2, and are conveyed via the textured surfaces 12 at the bottom 11 of the bottle 10. The textured surfaces are relatively fresh and clean during conveying. This because in the conveying process, the PET bottles are for example only conveyed for 1-10 minutes on the conveying face 6 formed by the flat, smooth top surfaces 4 of the plastic conveyor modules 5, so that during conveying deterioration of the textured surfaces 12 at the bottom 11 of each bottle 10 is negligible, and the coefficient of friction remains constant at about 0.06-0.18. The friction between the bottles and the conveying face can thus be reliably constant and low, without need for external lubrication.

The invention is not limited to the exemplary embodiment represented here. For example, the conveyor belt may be embodied as a mat or chain, and may even be of continuous, non modular construction. In addition, the conveyor belt may be part of a series of conveyor belts in the system. The conveyor belt may be made of hard material, e.g. steel or hard plastic, but may also be made of resilient material, e.g. rubber or elastomer. The bottles may have various shapes and sizes, and may be made of many different types of plastic materials, or compositions including plastic. Such variations shall be clear to the skilled person and are considered to fall within the scope of the invention as defined in the appended claims.

LIST OF REFERENCE SIGNS

1. Conveying system
2. Modular conveyor belt

3. Conveyor track
4. Top surface of module
5. Module
6. Conveying face
7. First divert elements
8. Second divert elements
9. Top run
10. Plastic bottle
11. Bottom
12. Textured surface
13. Support foot
14. Bottom wall
15. Projection
16. Base surface
P. Conveying direction

The invention claimed is:

1. A method of conveying bottles, said method comprising:
supporting at least one plastic bottle on a moving conveying face of a conveyor, said at least one plastic bottle having at least one textured surface defining projections to reduce friction, the at least one textured surface is provided at an end of a support foot projecting downward at the bottom of the at least one plastic bottle, the at least one textured surface being rough compared to an adjacent surface portion of the plastic bottle, wherein the at least one plastic bottle being supported on the conveying face via the projections of said at least one textured surface at a bottom of the plastic bottle.

2. The method of claim 1, wherein the at least one plastic bottle is conveyed without external lubrication between the at least one plastic bottle and the conveying face.

3. The method of claim 1, in which said conveyor is a modular conveyor belt formed from a plurality of modules supported on a conveyor track so that top surfaces of the modules of the conveyor belt present the conveying face that in use moves along the track in a conveying direction.

* * * * *